United States Patent Office 3,031,421
Patented Apr. 24, 1962

3,031,421
LAMINATE HAVING IMPROVED FABRICATING
PROPERTIES
William M. Boyer, Country Club Hills, Gilbert Gavlin, Lincolnwood, and Harlan E. Tarbell, Jr., Elmhurst, Ill., assignors to The Richardson Company, Melrose Park, Ill., a corporation of Ohio
No Drawing. Filed Sept. 8, 1958, Ser. No. 759,434
20 Claims. (Cl. 260—19)

This invention is concerned with synthetic industrial laminates and, more particularly, to laminates which may be fabricated at or near room temperatures without appreciable cracking or chipping.

Synthetic laminates have become widely adopted as insulation media in the electrical and electronic industries, in view of the fact that they can be tailor-made to meet various electrical and physical requirements that have been determined to be necessary. Such laminates are usually made by impregnating a filler sheet with a heat-curable synthetic resin, drying the impregnated sheet and partially curing the resin, superimposing a plurality of impregnated filler sheets in a build-up and subjecting the build-up to heat and pressure. The heat and pressure cures the resin and consolidates the build-up thereby forming an integral, hard, board-like product.

It is frequently necessary to punch, saw, or otherwise fabricate such laminates in order to render them suitable for a particular end use, such as a supporting board for electrical components, insulation in switch gears, and the like. The majority of synthetic laminates require preheating prior to fabricating in order to partially plasticize the laminate so as to prevent cracking or chipping during fabrication. Temperatures commonly employed for preheating range from about 150° F.–250° F., depending upon the particular filler and resins used in forming the laminate. Preheating of the laminate prior to fabrication is disadvantageous in that it involves an extra processing step and, correspondingly, an increase in cost. Further, synthetic laminates tend to shrink to less than their original size upon being subjected to an elevated temperature and subsequent cooling. Such a characteristic presents serious design and assembly problems.

Within the last several years, increased emphasis has been placed on developing synthetic laminates which are capable of being fabricated at much lower temperatures and, preferably, at or near room temperature. Further, for economical reasons, emphasis has also been directed to making laminates from less expensive fillers, particularly paper. While some success has been obtained in this area, most of the paper-base laminates which are considered to be capable of being fabricated at or near room temperature have a number of disadvantages. Quite frequently, the low temperature fabricating qualities built into laminates have been obtained by adding a plasticizer to the filler impregnating resin. In many instances, the plasticizer either bleeds from the resin or, upon even slight elevations in temperature, as may be encountered in use, will tend to volatilize and thereby escape from the laminate leaving voids and otherwise changing its physical, and to some extent, its electrical properties.

The present invention has as one object the formation of a laminate capable of being fabricated at room temperature or slightly above and which has none of the aforementioned disadvantages.

Another object is to provide a laminate of the foregoing type whose properties, both electrical and physical, are, in many instances, greatly improved over the properties of laminates heretofore required to be preheated prior to fabrication.

A further object is to provide a laminate of the foregoing type which may be formed from a cellulose fiber filler and, particularly, paper.

In brief, the invention involves impregnation of a cellulose fiber filler stock, particularly paper, with a resinous composition composed of what may be considered three basic components, namely, a fatty acid, an epoxy resin, and a phenolic resin. The three components may be varied within the over-all composition to achieve a variety of properties, depending on the properties required in the end product. This invention comprises a modification of the invention disclosed and claimed in our copending application, SN 758,554, filed September 2, 1958, now Patent No. 3,007,828, relating to a resinous composition comprising an epoxylated resin and a phenolic resin which has special utility in forming cellulose-base laminates particularly those made from a paper base, wherein markedly improved properties are obtained in the laminates.

As indicated, one of the principal components is a fatty acid which may contain either one or a plurality of carboxyl groups whereby it is either monofunctional or polyfunctional. Fatty acids contemplated are those having between eight to eighteen carbon atoms in the molecule of the acid. These acids may be those commonly referred to as drying oils having various degrees of unsaturation or may be saturated acids. Typical fatty acids are linoleic, oleic, stearic, linolenic, caprylic, lauric, and palmitic. Although all of the fatty acids having carbon atoms within the aforementioned range are suitable, those acids having eighteen carbon atoms in the molecule are preferable for the reason that they have less tendency to volatilize from the laminate in the event the laminate may be subjected to elevated temperatures. In addition to the monomer form of acid, the dimer or trimer forms of those unsaturated acids which polymerize may also be used, and, in most instances, are to be preferred over fatty acids having less than eighteen carbons in the molecule. Illustrative unsaturated fatty acids which form dimers or trimers are linoleic and linolenic. The acid component of the present system serves, when reacted with the epoxy component, as an integral plasticizer which is difficult, if not impossible, to remove under normal conditions of use.

The second component is an epoxy resin and, principally, a polyfunctional epoxy resin having the equivalent of more than one epoxy group per molecule. Typical epoxy resins which may be used are the polyglycidyl ethers formed by the reaction of a bisphenol with epichlorohydrin, a resin of this type being sold by Shell Chemical Company under its trademark "Epon 828." Also suitable are the polyglycidyl ethers of novolaks formed by reacting epichlorohydrin with a permanently fusible phenolic formaldehyde condensation product and the corresponding polyglycidyl ethers of polyfunctional alcohols, such as are sold by Ciba Company, Inc. under their trademark "Araldite RD-2."

The third principal component of the present invention is a phenolic resole and, predominantly, a phenolic resole having the ability to readily penetrate cellulosic fibers. Cellulose fibers are characterized by having a hollow tubular-like structure which must be substantially filled with resin to prevent subsequent penetration by moisture and a corresponding decrease in electrical properties. Generally, resins may be classified as penetrating or coating resins. A typical phenolic resin contemplated by the present invention which has penetrating characteristics is a resole formed by condensing phenol and formaldehyde in the presence of an alkali catalyst. Phenolic resins which have predominantly coating characteristics, such as a cresol aldehyde, or a xylenol aldehyde condensation product, are, in general, not suitable for use by themselves or as the predominant component with a penetrating phenolic resin. However, certain intermediate resins between a purely penetrating and purely coating resin may be used under some circumstances, an example being a resole formed by condensing mixtures of phenol and a cresol with formaldehyde. If a resin having both penetrating and coating characteristics is used, the penetrating component should constitute the predominant part of the resin, preferably, fifty percent or more, although the exact amount will vary depending upon, for example, the type of paper used as a filler or the type of epoxy resin. In the event that the particular epoxy resin employed is capable of penetrating a cellulosic fiber filler to an appreciable degree, less penetrating phenolic resin may be used and more of the coating type can be employed. A typical phenolic resin which has given excellent results is Bakelite 3913 comprising primarily phenol formaldehyde.

If a monofunctional fatty acid containing one carboxyl group is used in forming the impregnating resin, the acid is, preferably, first heated with the epoxy to form the hydroxyl ester, the temperature, generally, being of the order of 170° C., with the reaction extending for approximately an hour. Phenolic resin is then added to the reaction product of the acid and epoxy resin, the resultant mixture then being formed as a varnish by adding water and one or more organic solvents.

The foregoing process involves an initial reaction between a monofunctional acid and an epoxylated resin which is desired when using such an acid in order to insure that the acid reacts with the epoxy resin. When using a polycarboxylic acid or the preferred dimers or trimers of those unsaturated monofunctional fatty acids which are capable of forming polymers, it is not necessary to employ the initial reaction step between the acid and the epoxy, but rather a suitable varnish for impregnating a cellulosic filler may be made by mixing directly the acid, epoxy, resin, and phenolic resin in an appropriate water-organic solvent. This mixture, without further treatment, may then be used to impregnate filler stock. In view of the elimination of the initial acid-epoxy step, the latter process is preferred, although specific properties desired in the finished laminate may require the use of a monocarboxylic acid.

It has been found that water, within certain ranges, must be present to insure adequate penetration of the filler by the resinous components of the composition. An excess of water will result in a decrease in wet strength of the filler, especially if the filler is paper. In general, water, as part of the composition vehicle, should comprise between two to twenty percent of the total weight of the composition.

To dissolve the epoxy and phenolic resin, a single organic solvent for both may be used, however, it has been found preferable to employ two different but compatible solvents. Excellent results have been obtained by using either one of the following solvent systems.

(1) Methyl ethyl ketone
    Tetrahydrofuran or dioxane
    Water
(2) Isopropanol
    Methyl ethyl ketone or dioxane
    Water In preparing the impregnated filler, a paper such as Hurlbut 504 is usually withdrawn from a roll at a predetermined rate, passed through a bath containing the varnish and then introduced into an oven having a temperature of the order of 140° C. The speed of travel is such that any particular point on the sheet will take from about six to eight minutes to pass through the oven. This drying operation removes volatiles from the impregnated filler and partially cures the resin. After impregnation, the filler is cut to predetermined sizes and a plurality of sheets superimposed to form a build-up. The build-up is then introduced between the platens of a press and subjected to heat and pressure.

The laminate is formed in the press under pressures of about 1000–1200 p.s.i., at a temperature of between 145° C. to 165° C., and normally for periods of approximately forty-five minutes to one hour and fifteen minutes. As will be appreciated by those familiar with the laminating art, the time and temperature used in forming laminates under pressure are inversely related in that the lower temperatures require longer periods and conversely higher temperatures require shorter periods to obtain a final cure. As this invention is principally directed to forming laminates from cellulose fillers and particularly paper, temperatures much above 165° C. are normally not used in order to avoid degradation of the cellulose.

Laminates may be formed, as contemplated by the present invention which are capable of being fabricated without appreciable creation of cracks or chips at temperatures of between about 75° F.–90° F., normally referred to as room temperatures. To achieve such fabricating temperatures, the fatty acid component should comprise between about thirty to one hundred and twenty percent by weight of the epoxy resin and the phenolic resin should be present to the extent of about one-half to three times by weight of the epoxy resin. For certain special applications, it may be desirable to have laminates which fabricate without appreciable cracks or chips at temperatures slightly higher than room temperatures, of the order of 100° F. to 120° F. This may be accomplished by eliminating a part of the fatty acid component. Conversely, the fabricating temperatures may be lowered, if desired, by adding fatty acids in quantities above those indicated hereinabove. In general, however, fabricating temperatures lower than room temperature are usually unnecessary and, in addition, presents certain disadvantages. For example, if more fatty acid is used than may be required to produce desired room temperature fabricating characteristics, the laminate will tend to be overplasticized to the extent that it may not adequately support electrical components.

The present room temperature fabricating laminates contemplated by this invention have properties which are at least equivalent to and frequently better than the premium XXXP grades presently available to the industry. For example, flexural strengths of laminates contemplated by this invention are of the order of 8000 p.s.i. or above as determined by ASTM Test No. D790–49T. In addition, the present laminates have an insulation resistance, as determined by the ASTM Test No. D257–52T, of one million megohms or above as well as low power factor and dielectric constant changes. Further, such laminates have been found to have an unusually high resistance to the action of boiling trichloroethylene vapors. Thus, laminates made in accordance with this invention have been found to withstand the trichloroethylene vapors for a period of about fifteen minutes before a noticeable pitting or surface deformation occurs, which is not characteristic of most of the commercially available room temperature fabricating laminates. The primary reason for the failure of many laminates under this test is believed to be due to the fact that such laminates use the heretofore mentioned fugitive plasticizers which are readily susceptible to trichloroethylene and, hence, may be leached out of the laminate.

As further illustrating the invention but without otherwise intending to limit the same, the following examples are presented.

*Example 1*

Buckeye BC–10 cotton linters .010 inch paper was impregnated with the following composition, the parts being by weight.

14.2 Empol 3055S (Emery Industries—70–75% $C_{54}$ tribasic acids, primarily trimerized linoleic acid)
14.2 Epon 828 (Shell)

20.2 Durez 19139 phenolic resole
14.2 Dioxane
28.4 Isopropanol
8.6 Water
0.1 Ethylenediamine (catalyst)

After impregnation, the paper was subjected to 140° C. for 7.5 minutes in an air circulating oven. A plurality of impregnated sheets sufficient to make a final laminate thickness of .062 inch was placed in a press and subjected to a pressure of 1200 p.s.i. for sixty minutes at a temperature of 165°. The resin content of the cured laminate was determined to be fifty-one percent by the total weight. The following test data was developed from the sample.

| Property | ASTM No. | Results |
| --- | --- | --- |
| Punched without cracks | | 78° F. |
| Flexural Strength | D790-49T | 10,000 p.s.i. |
| Water Absorption | D570-42 | 0.8%. |
| Insulation Resistance | D257-52T | $5 \times 10^{12}$ ohms. |
| Power Factor | D150-47T | .040. |

*Example 2*

Kraft paper was saturated with the following composition.

21.1 Empol 3055S
12.1 Bakelite 3913 phenolic resole
15.2 Epoxylated Novolak (2–1 phenolformaldehyde)
0.1 Triethylenetetramine
27.3 Dioxane
18.2 Methyl ethyl ketone
6.1 Water After saturation, the paper was placed in a 140° C. air circulating oven for fourteen minutes followed by a second oven treatment at 138° C. for five minutes, the volatile content thereby being reduced to 0.3%. A laminate was made from this stock under a pressure of 1200 p.s.i. for a period of sixty minutes at a temperature of 165° C. The following properties were found using the same test procedures as above.

Punched without cracks_____ 120° F.
Flexural strength_____ 20,000 p.s.i.
Water absorption_____ 0.8 percent
Insulation resistance_____ $10^{12}$ ohms
Power factor_____ .034

In determining the power factor, the laminate is immersed in water for a period of twenty-four hours at 23° C. before test. Insulation resistance is measured after subjecting the laminate to ninety percent humidity at 40° C. for a period of ninety-six hours.

As indicated, the present invention enables the production of laminates capable of being fabricated at room temperatures or slightly above while simultaneously maintaining or improving the physical and electrical properties. The use of the fatty acids as one of the major components of the varnish serves to introduce a chemically bound plasticizer into the cured resin of the laminate which is not easily removed as are many of the plasticizers currently employed.

Having described the invention and certain exemplary embodiments thereof, the same is only intended to be limited by the scope of the following claims.

We claim:

1. A heat-curable resinous composition consisting essentially of an epoxylated resin, a phenolic resin consisting predominantly of a phenol formaldehyde resole, a fatty acid having at least eighteen carbon atoms, said fatty acid and phenolic resin comprising between 30%–120% and 50%–300%, respectively, by weight of said epoxylated resin and a solvent including between about two to twenty percent water based on the total weight of said composition.

2. A heat-curable resinous composition as described in claim 1 wherein the solvent comprises, in addition to water, methyl ethyl ketone and a member of the group consisting of tetrahydrofuran and dioxane.

3. A heat-curable resinous composition as described in claim 2 wherein the epoxylated resin is the reaction product of a bisphenol and epichlorohydrin.

4. A heat-curable resinous composition as described in claim 2 wherein the epoxylated resin is the reaction product of epichlorohydrin with the permanently fusible condensation product of a phenol and an aldehyde.

5. A heat-curable resinous composition consisting essentially of the reaction product of a bisphenol and epichlorohydrin, a phenolic resin consisting predominantly of a phenol formaldehyde resole, a fatty acid having at least eighteen carbon atoms, said fatty acid and phenolic resin comprising between 30%–120% and 50%–300%, respectively, by weight of said epoxylated resin; and a solvent comprising about ten percent water based on the total weight of the composition, methyl ethyl ketone and a member of the group consisting of tetrahydrofuran and dioxane.

6. A heat-curable resinous composition consisting essentially of an epoxylated resin, a phenolic resin consisting predominantly of a phenol formaldehyde resole, a fatty acid having at least eighteen carbon atoms, said fatty acid and phenolic resin comprising between 30%–120% and 50%–300%, respectively, by weight of said epoxylated resin; and a solvent comprising water in the amount of between two to twenty percent of the total weight of said composition, isopropanol and a member of the group consisting of methyl ethyl ketone and dioxane.

7. A heat-curable resinous composition as described in claim 6 wherein the water comprises approximately ten percent of the weight of said composition.

8. A heat-curable resinous composition as described in claim 7 wherein the epoxylated resin is the reaction product of a bisphenol and epichlorohydrin.

9. In a process for making a laminate comprising impregnating a cellulose fiber filler with a heat-curable resinous composition consisting essentially of an epoxylated resin, a phenolic resin consisting predominantly of a phenol formaldehyde resole, a fatty acid having at least eighteen carbon atoms, said fatty acid and phenolic resin comprising between 30%–120% and 50%–300%, respectively, by weight of said epoxylated resin; and a solvent wherein said solvent includes water in an amount of between about two to twenty percent of the total weight of said composition.

10. The process as described in claim 9 wherein the solvent, in addition to water, comprises methyl ethyl ketone and a member selected from the class consisting of tetrahydrofuran and dioxane.

11. The process as described in claim 10 wherein the epoxylated resin is the reaction product of a bisphenol and epichlorohydrin.

12. The process as described in claim 10 wherein the epoxylated resin is the reaction product of epichlorohydrin with the permanently fusible condensation product of a phenol and an aldehyde.

13. The process as described in claim 9 wherein the water comprises about ten percent of the total weight of said resinous composition.

14. The process as described in claim 9 wherein the solvent, in addition to water, comprises isopropanol and a member selected from the class consisting of methyl ethyl ketone and dioxane.

15. A process for making a laminate comprising impregnating a paper filler with a composition consisting essentially of an epoxylated resin, a phenolic resin consisting predominantly of a phenol formaldehyde resole, a fatty acid having at least eighteen carbon atoms, said fatty acid and phenolic resin comprising between 30%–

120% and 50%–300%, respectively, by weight of said epoxylated resin; and a solvent including water in the amount of between about two to twenty percent of the total weight of said composition, drying said filler and partially curing the resins, forming a build-up of a plurality of impregnated filler sheets and subjecting said build-up to heat and pressure to finally cure the resins and form an integral hard board-like product.

16. A synthetic laminate capable of being fabricated at temperatures between about 75° F.–90° F. without appreciable creation of cracks or chips comprising a plurality of cellulose fiber filler sheets impregnated with a composition consisting essentially of an epoxylated resin, a phenolic resin consisting predominantly of a phenol formaldehyde resole and a fatty acid having at least eighteen carbon atoms, said fatty acid and phenolic resin comprising between 30%–120% and 50%–300%, respectively, by weight of said epoxylated resin, the whole being consolidated into a hard board-like product, said laminate having a minimum insulation resistance of approximately one million megohms.

17. A laminate as described in claim 16 wherein said filler sheets are paper.

18. A laminate as described in claim 16 wherein said epoxylated resin is the polyglycidyl ether of a bisphenol.

19. A laminate as described in claim 16 wherein the epoxylated resin is the polyglycidyl ether of a permanently fusible condensation product of a phenol and an aldehyde.

20. A synthetic laminate capable of being fabricated at temperatures between about 75° F.–90° F. without appreciable creation of cracks or chips comprising a plurality of cellulose fiber filler sheets impregnated with a composition consisting essentially of a polyglycidyl ether of a bisphenol, a phenolic resin consisting predominantly of a phenol formaldehyde resole and a polymerized linoleic acid, said fatty acid and phenolic resin comprising between 30%–120% and 50%–300%, respectively, by weight of said epoxylated resin, the whole being consolidated into a hard, board-like product, said laminate having a minimum insulation resistance of approximately one million megohms.

References Cited in the file of this patent
UNITED STATES PATENTS

| | | |
|---|---|---|
| 2,521,911 | Greenlee | Sept. 12, 1950 |
| 2,698,308 | Crecelius | Dec. 28, 1954 |
| 2,798,833 | Lapsensohn et al. | July 9, 1957 |
| 2,810,674 | Madden | Oct. 22, 1957 |
| 2,839,434 | Haughney et al. | July 17, 1958 |
| 2,848,431 | Dean et al. | Aug. 19, 1958 |
| 2,893,966 | Greenlee | July 7, 1959 |
| 2,897,165 | Rowland et al. | July 28, 1959 |